(12) United States Patent
Lin

(10) Patent No.: US 7,434,237 B2
(45) Date of Patent: Oct. 7, 2008

(54) OPTICAL DISC DRIVE AND METHOD FOR MANUALLY EJECTING A CASSETTE

(75) Inventor: Jui-Chiang Lin, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 351 days.

(21) Appl. No.: 11/163,315

(22) Filed: Oct. 14, 2005

(65) Prior Publication Data

US 2006/0085804 A1    Apr. 20, 2006

(30) Foreign Application Priority Data

Oct. 19, 2004    (TW) .............................. 93131629 A

(51) Int. Cl.
*G11B 33/02* (2006.01)
(52) U.S. Cl. .................................................... 720/609
(58) Field of Classification Search .............. 360/98.04, 360/98.05, 98.06, 92; 369/30.42, 30.45, 369/30.84; 414/283; 720/609
See application file for complete search history.

(56) References Cited

U.S. PATENT DOCUMENTS 5,247,406 A * 9/1993 Apple et al. .................. 360/92
5,392,266 A * 2/1995 Kobayashi et al. ........ 369/30.45
5,442,500 A * 8/1995 Hidano et al. ................. 360/92
5,608,714 A * 3/1997 Shiba et al. .............. 369/30.84
5,943,305 A * 8/1999 Fitzgerald et al. ........ 369/30.42
2005/0063802 A1* 3/2005 Luffel ......................... 414/283

FOREIGN PATENT DOCUMENTS

JP       01154361 A  *  6/1989

* cited by examiner

*Primary Examiner*—Tianjie Chen
(74) *Attorney, Agent, or Firm*—Jianq Chyun IP Office

(57) ABSTRACT

An optical disc drive comprising at least a housing, an optical disc cassette, a cassette ejector and a fixing element is provided. The housing has an ejection opening. The cassette ejector and the fixing element are disposed in the housing. The optical disc cassette is disposed inside the housing for holding a plurality of optical discs. The housing has an open fixing groove. The fixing element lodges on the open fixing groove when the optical disc cassette is pushed into the housing. When the optical disc cassette is manually ejected, a manual ejection element that passes through the ejection opening is used to change the relative position between the fixing element and the open fixing groove. Consequently, the optical disc cassette can be ejected from the housing by the cassette ejector.

20 Claims, 5 Drawing Sheets

OPTICAL DISC DRIVE AND METHOD FOR MANUALLY EJECTING A CASSETTE

CROSS-REFERENCE TO RELATED APPLICATION

This application claims the priority benefit of Taiwan application serial no. 931 31 629, filed on Oct. 19, 2004. All disclosure of the Taiwan application is incorporated herein by reference.

BACKGROUND OF THE INVENTION

1. Field of the Invention

The present invention relates to an electronic apparatus and an ejection method. More particularly, the present invention relates to an optical disc drive and a method for manually ejecting a cassette.

2. Description of the Related Art

With advantages such as large data storage capacity, easy storage access, long service life, low production cost and invulnerability to data damage, optical discs have gradually replaced the conventional magnetic storage medium to become one of the indispensable optical storage media. In a conventional optical disc drive, only one optical disc can be loaded at a time, thus users must change the disc manually to read the data in another disc. In solution, optical disc drives capable of holding a number of optical discs at a time have been introduced and users can obtain data from a particular optical disc without having to change the disc manually.

A conventional optical disc drive capable of storing a plurality of optical discs comprises a host and an optical disc cassette. After loading a plurality of optical discs into the optical disc cassette, the optical disc cassette can be pushed into the host for a data accessing operation. However, the ejection of the optical disc cassette is controlled electrically through the optical disc drive. Thus, if the power supply to the optical disc drive is off or the driving signal is in error, then the optical disc cassette has no other means of ejecting the cassette. As a result, users cannot get the optical discs stored inside the optical disc cassette. This is especially inconvenient when the users need some of the optical discs inside the optical disc cassette.

SUMMARY OF THE INVENTION

Accordingly, at least one objective of the present invention is to provide an optical disc drive capable of resolving the issue that an optical disc cassette cannot be ejected electrically.

At least a second objective of the present invention is to provide a method for manually ejecting an optical disc cassette to resolve the issue that an optical disc cassette cannot be ejected electrically.

To achieve these and other advantages and in accordance with the purpose of the invention, as embodied and broadly described herein, the invention provides an optical disc drive. The optical disc drive mainly comprises a first housing, a disc exchanger, a data processing module, an optical disc cassette, a cassette ejector, a fixing element and a manual ejection element. The disc exchanger is disposed inside the first housing and is adapted within an operating range. The data processing module is disposed within the operating range inside the first housing. The optical disc cassette is disposed within the operating range inside the first housing for holding a plurality of optical discs. The optical disc cassette has an open fixing groove. The cassette ejector is set up on the first housing. The fixing element is set up on the first housing as a movable component and is suitable for lodging on the open fixing groove. The manual ejection element is connected to the fixing element and a portion of the manual ejection element is located on the first housing. The manual ejection element is suitable for changing the relative position between the fixing element and the open fixing groove so that the cassette ejector can eject the optical disc cassette from the first housing.

In the aforementioned optical disc drive, the manual ejection element is a piece of string or a rod, for example. In addition, the optical disc drive may further comprise a pulling element connected to the portion of the manual ejection element located on the first housing. Furthermore, the first housing may have an ejection opening. The pulling element is connected to the manual ejection element through the ejection opening. The pulling element has a dimension greater than the ejection opening. The first housing has an inlay groove where the ejection opening is located. Moreover, the pulling element is suitable for lodging on the inlay groove.

The present invention also provides an optical disc drive whose optical disc cassette can be ejected manually. The optical disc drive mainly comprises a first housing, a disc exchanger, a data processing module, an optical disc cassette, a cassette ejector and a fixing element. The first housing has an ejection opening. The disc exchanger is disposed inside the first housing and is adapted within an operating range. The data processing module is disposed within the operating range inside the housing. The optical disc cassette is disposed within the operating range inside the first housing for holding a plurality of optical discs. The optical disc cassette has an open fixing groove. The cassette ejector is set up on the first housing. The fixing element is set up as a movable component on the first housing and is suitable for lodging on the open fixing groove. By manual changing the relative position between the fixing element and the open fixing groove, the optical disc cassette can be ejected from the first housing through the cassette ejector.

In the two aforementioned optical disc drives, the optical disc cassette is disposed inside the first housing in a first direction and the fixing element moves along a second direction, which is perpendicular to the first direction.

In addition, the open fixing groove further comprises a sliding groove portion and a lodging groove portion. The sliding groove portion is linked to the lodging groove portion and the fixing element is suitable for sliding into the sliding groove portion and lodging into the lodging groove portion. The extension line of the sliding groove portion forms an angle smaller than 90° with the extension line of the lodging groove portion. The optical disc cassette is disposed in the first housing along a first direction, for example. The extension line of the lodging groove portion is perpendicular to the first direction, for example.

In the aforementioned optical disc drive, manual ejection is achieved through a rod, for example. The rod passes through the ejection opening and is suitable for changing the relative position between the fixing element and the open fixing groove. Alternatively, the fixing element has a protruding portion that protrudes in the ejection opening and is exposed outside the optical disc drive, and the protruding portion is suitable for moving inside the ejection opening.

In addition, the optical disc cassette may further comprise a second housing and a plurality of optical disc carriers. The second housing has an inner wall, an opening and multiple sets of guiding tracks. The sets of guiding tracks are disposed on the inner wall. The guiding tracks extend towards the opening, for example. The optical disc carriers are disposed inside the second housing. Each optical disc carrier is suitable for sliding along a set of guiding tracks. Furthermore, the data processing module includes an optical disc reading module or an optical disc reading/writing module, for example.

The present invention also provides a manual cassette ejection method for an optical disc drive. The optical disc drive mainly comprises a housing, an optical disc cassette, a cassette ejector and a fixing element. The optical disc cassette is disposed inside the housing for holding a plurality of optical discs. The cassette ejector is used for ejecting the optical disc cassette from the housing. The fixing element is set up on the housing as a movable component and is suitable for lodging the optical disc cassette inside the housing. The manual cassette ejection method includes manually releasing the lodging relation between the fixing element and the optical disc cassette so that the optical disc cassette can be ejected from the housing through the cassette ejector.

In the manual cassette ejection method, the manual release of the lodging relation between the fixing element and the optical disc cassette is achieved through pushing or pulling the fixing element, wherein the pulling may carry out through a piece of string linked to the fixing element. Alternatively, the fixing element is moved by a rod that passes through an ejection opening in the housing or pushing a protruding portion of the fixing element that protrudes in an ejection opening of the housing.

In brief, the optical disc drive and the manual cassette ejection method of the present invention is able to eject the optical disc cassette from the housing manually even if the power supply to the optical disc drive is off or the driving signal is in error, thereby making it more convenient for users.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
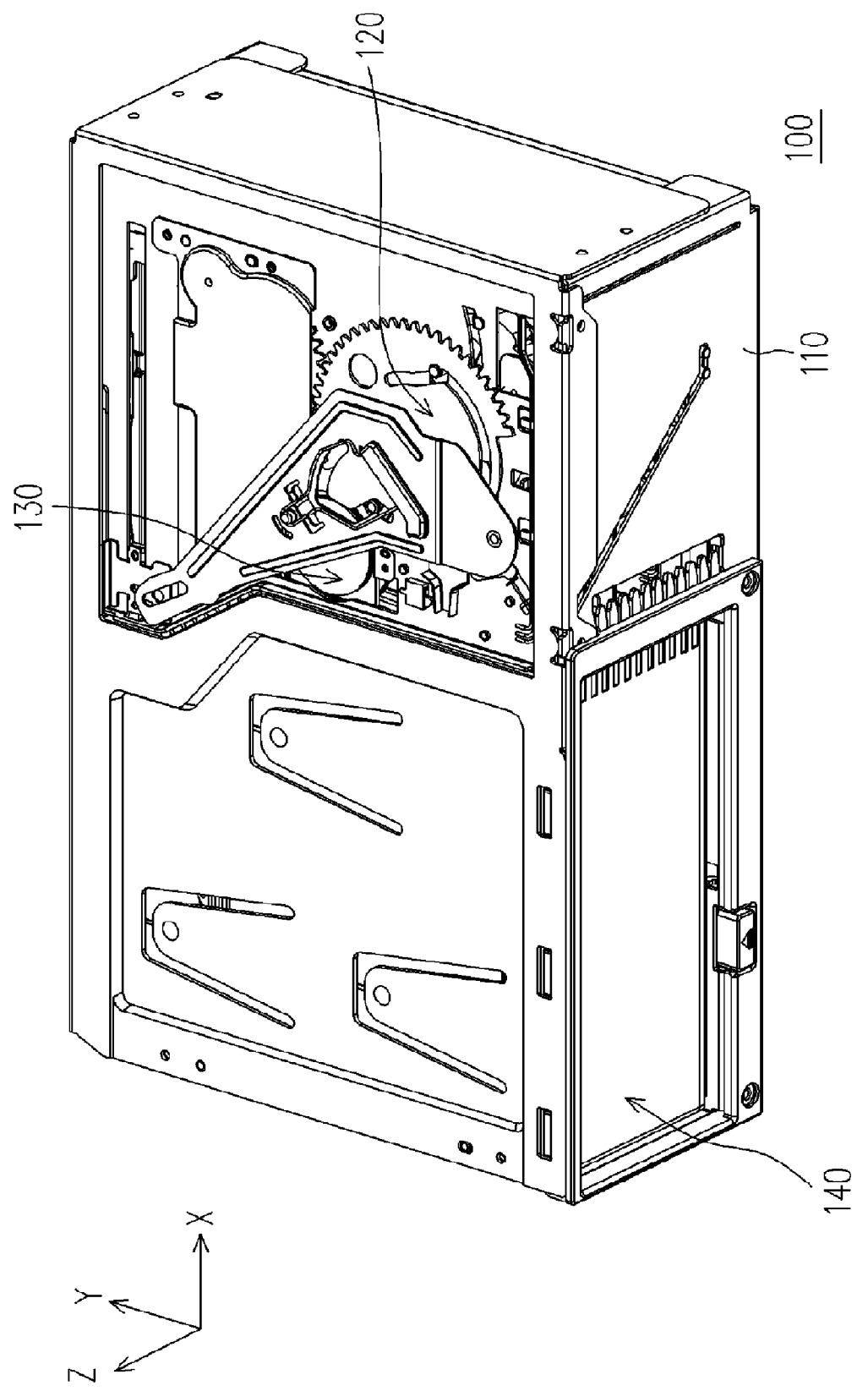
FIG. 1 is a perspective view of an optical disc drive according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a perspective view of an optical disc drive according to one embodiment of the present invention. As shown in FIG. 1, the optical disc drive 100 can be a compact disc player (a CD player), a laser optical video disc player (a LD player), a video compact disc player (a VCD player), a digital video disc player (a DVD player) or other optical disc players capable of storing multiple optical discs, for example. The optical disc drive 100 mainly comprises a housing 110, a disc exchanger 120, a data processing module 130, an optical disc cassette 140, a cassette ejector 150 (shown in FIG. 3), a fixing element 160 (shown in FIG. 2A) and a manual ejection element 170 (shown in FIG. 2A).

The disc exchanger 120 is set up inside the housing 110 and is adapted within an operating range. The data processing module 130 is also set up inside the housing 110 and within the operating range of the disc exchanger 120. The optical disc cassette 140 is suitable for holding a plurality of optical discs (not shown) and disposed inside the housing 110 within the operating range of the disc exchanger 120. The disc exchanger 120 is used for moving an optical disc from the optical disc cassette 140 to the data processing module 130 or returning the optical disc from the data processing module 130 to the optical disc cassette 140. The disc exchanger 120 is a combination set of a lever and a gear wheel or other suitable mechanism, for example, and not limited to the design shown in FIG. 1. The data processing module 130 is an optical disc reading module for reading data from an optical disc, for example. However, the data processing module 130 can be an optical disc reading/writing module for writing data into an optical disc.

Figure 2A:
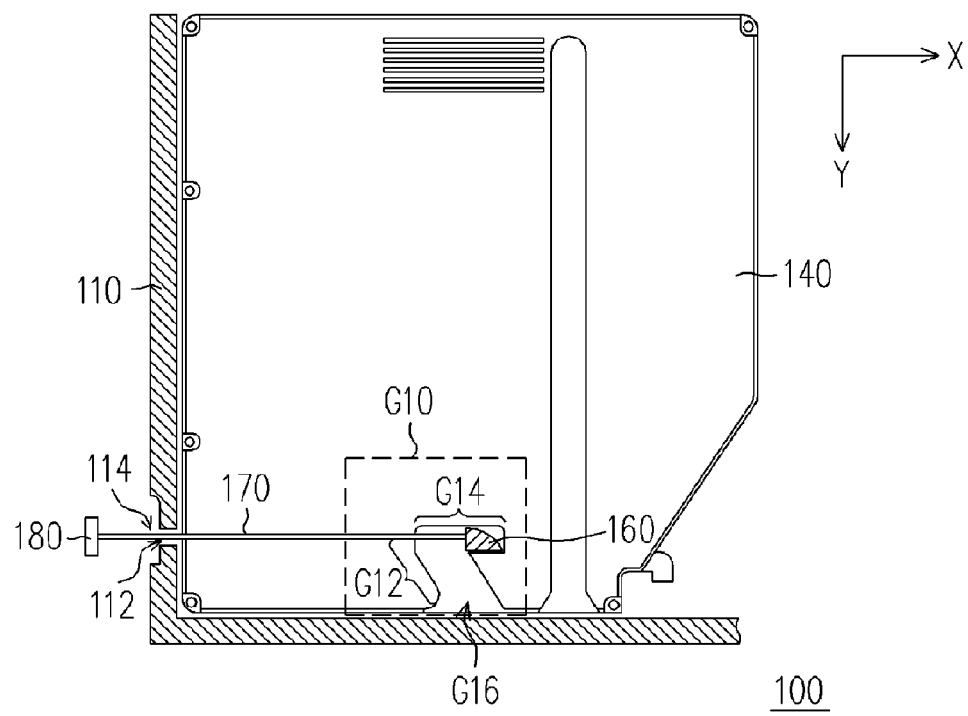
FIGS. 2A and 2B are partial cross-sectional views of the optical disc drive during a manual cassette ejection in FIG. 1 in a direction perpendicular to the Z-axis.
Figure 2B:
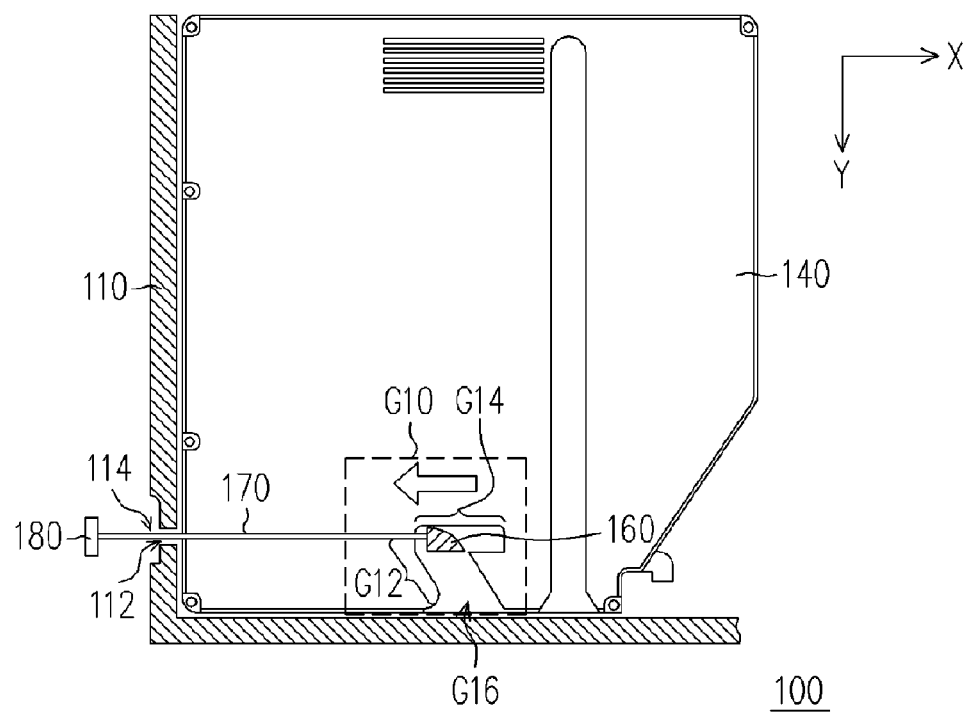

FIGS. 2A and 2B are partial cross-sectional views of the optical disc drive during a manual cassette ejection in FIG. 1 in a direction perpendicular to the Z-axis. As shown in FIG. 2A, the housing 110 of the optical disc drive 100 has an ejection opening 112, for example. The surface of the optical disc cassette 140 in contact with the housing 110 has an open fixing groove G10. The open fixing groove G10 is not sealed so that the corresponding fixing element 160 can enter the open fixing groove G10 unhindered. The open fixing groove G10 comprises a sliding groove portion G12 and a lodging groove portion G14 linked to the sliding groove portion G12. Furthermore, the fixing element 160 is suitable for sliding in the sliding groove portion G12 and lodging into the lodging groove portion G14. The entrance G16 of the sliding groove portion G12 is located at the front end of the optical disc cassette 140 when the optical disc cassette 140 is pushed into the housing 110. In other words, when the optical disc cassette 140 is pushed into the housing 110, the side with the entrance G16 of the optical disc cassette 140 moves firstly into the housing 110. The extension line of the sliding groove portion G12 forms an angle smaller than 90° with the extension line of the lodging groove portion G14. The optical disc cassette 140 moves along the Y-axis direction into the housing 110, for example. The extension line of the lodging groove portion G14 is in the X-axis direction, which is perpendicular to the Y-axis direction.

Figure 3:
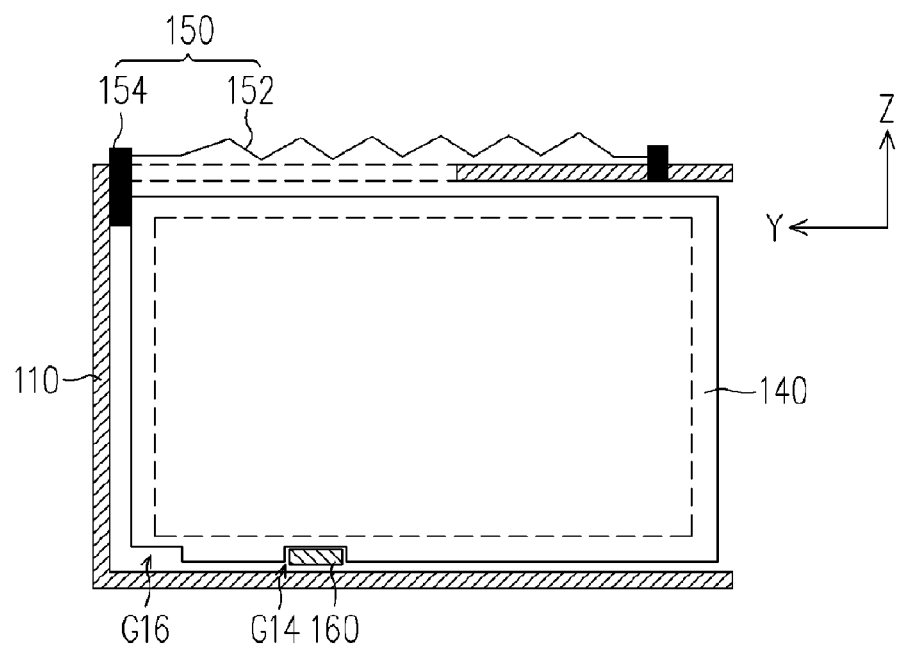
FIG. 3 is a cross-sectional view of the optical disc drive in FIG. 1 in a direction perpendicular to the X-axis.

FIG. 3 is a cross-sectional view of the optical disc drive in FIG. 1 in a direction perpendicular to the X-axis. As shown in FIGS. 2A, 2B and 3, the cassette ejector 150 is disposed on the housing 110 for ejecting the optical disc cassette 140 from the housing 110. The cassette ejector 150 comprises a spring 152 and a stopping element 154. One end of the spring 152 is fastened to the housing 110 while the other end of the spring 152 is connected to the stopping element 154. The stopping element 154 has at least a portion extending into the interior of the housing 110. The fixing element 160 is set up on the housing 110 as a movable component in a position corresponding to the entrance G16 of the open fixing groove G10 and is suitable for lodging into the open fixing groove G10.

More definitely, when the optical disc cassette 140 moves along the Y-axis direction into the housing 110, the fixing element 160 first enters the entrance G16 of the open fixing groove G10. Thereafter, as the optical disc cassette 140 moves further into the housing 110, the fixing element 160 will be guided by the wall of the sliding groove portion G12 of the open fixing groove G10 to move along the X-axis direction. Finally, the fixing element 160 will reach the junction between the sliding groove portion G12 and the lodging groove portion G14 of the open fixing groove G10 as shown in FIG. 2B. When the fixing element 160 reaches the lodging groove portion G14 of the open fixing groove G10, because the fixing element 160 is no longer pushed by the wall of the open-type fixing groove G10, the fixing element 160 will stay in the lodging groove portion G14 of the open fixing groove G10. Furthermore, the fixing element 160 will station in the original location in the X-axis as shown in FIGS. 2A and 3. In addition, when the optical disc cassette 140 is pushed into the housing 110, the stopping element 154 is also driven by the optical disc cassette 140 to stretch the spring 152 as well. At this moment, due to the interference between the fixing element 160 and the wall of the lodging groove portion G14 of the open fixing groove G10, the optical disc cassette 140 is stationed inside the housing 110.

As shown in FIGS. 2A and 2B, the manual ejection element 170 passes through the ejection opening 112. One end of the manual ejection element 170 is connected to the fixing element 160. Furthermore, a portion of the manual ejection element 170 is disposed in the housing 110. Thus, a user can deliver a force to the fixing element 160 through the manual ejection element 170 so as to change the relative position between the fixing element 160 and the open fixing groove G10. More definitely, a user may use the manual ejection element 170 to move the fixing element 160 to the junction between the lodging groove portion G14 and the sliding groove portion G12 of the open fixing groove G10 as shown in FIG. 2B. Because the fixing element 160 is no longer interfered by the open fixing groove G10 in the Y-axis direction, the cassette ejector 150 will eject the optical disc cassette 140 from the interior of the housing 110 by the pull of the stopping element 154 provided by the stretched spring 152.

It should be noted that the way the fixing element 160 is moved by the manual ejection element 170 is not limited to a pull as shown in FIG. 2B. The fixing element 160 can also be pushed or moved by other means. In the meantime, the layout of the open fixing groove G10 will also affect the way the fixing element 160 moves. The main purpose of moving the fixing element 160 is to release the lodging relation between the fixing element 160 and the open fixing groove G10 of the optical disc cassette 140 in the ejection direction (the Y-axis direction). Once the lodging relation between the two is released, the cassette ejector 150 can eject the optical disc cassette 140 from the housing 110. Therefore, any ejection design that can release the lodging relation between the fixing element 160 and the optical disc cassette 140 can be used in the present invention.

In the present embodiment, the manual ejection element 170 can be a piece of string. Obviously, the manual ejection element 170 can be a long and narrow rod or other object capable of delivering a force. Additionally, the optical disc drive 100 may further comprises a pulling element 180 connected to a portion of the manual ejection element 170 disposed on the housing 110 to facilitate the pulling of the manual ejection element 170 by a user. The pulling element 180 is connected to the manual ejection element 170 via the ejection opening 112. Preferably, the pulling element 180 has a dimension greater than the dimension of the ejection opening 112 to prevent the entire manual ejection element 170 from being pulled inside the housing 110 such that the disc cannot be ejected manually. Moreover, an inlay groove 114 can be disposed on the exterior wall of the housing 110 and the ejection opening 112 can be disposed within the inlay groove 114 so that the pulling element 180 can be lodged on the inlay groove 114. The design of the inlay groove 114 can avoid the manual ejection element 170 from being accidentally pulled by the user and renders the exterior more appealing from an aesthetic point of view. Obviously, the design must at least reserve some space for the user to pull the pulling element 180 from the inlay groove 114.

Figure 4:
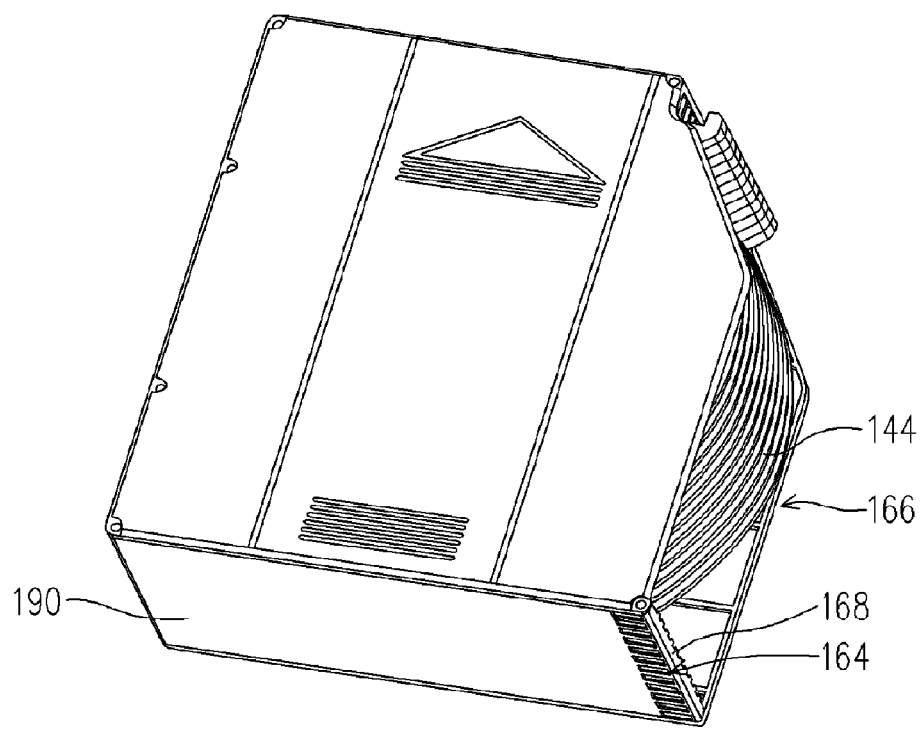
FIG. 4 is a perspective view of an optical disc cassette of the optical disc drive in FIG. 1.

FIG. 4 is a perspective view of an optical disc cassette of the optical disc drive in FIG. 1. As shown in FIG. 4, the optical disc cassette 140 comprises a housing 190 and a plurality of optical disc carriers 144, for example. The housing 190 has an inner wall 164, an opening 166 and multiple sets of guiding tracks 168. The guiding track sets 168 are disposed on the inner wall 164 of the housing 190. Furthermore, each set of guiding tracks extends towards the opening 166. The optical disc carriers 144 are disposed inside the housing 190, for example. Each optical disc carrier 144 is suitable for holding an optical disc and sliding on a set of guiding tracks 168. Because the optical disc cassette 140 can hold a plurality of optical discs at the same time, a user can select the desired optical disc for reading without having to change the optical disc manually, thus saving the time for changing a disc and making it more convenient to read data from the optical discs.

Figure 5A:
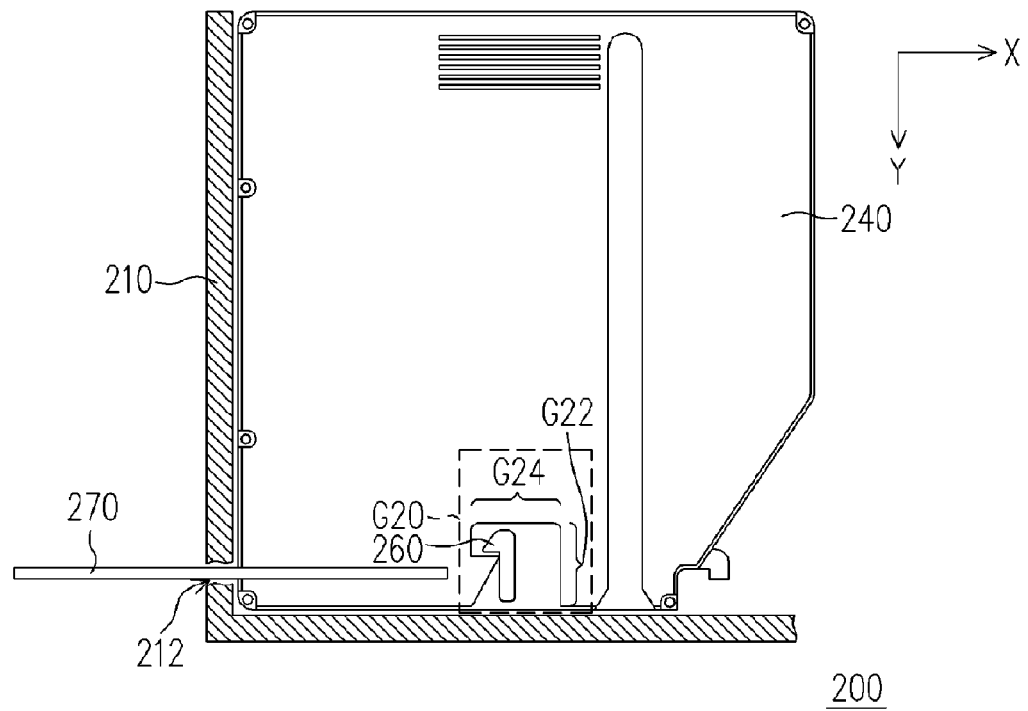
FIGS. 5A and 5B are partial cross-sectional views of an optical disc drive during a manual cassette ejection according to another embodiment of the present invention.
Figure 5B:
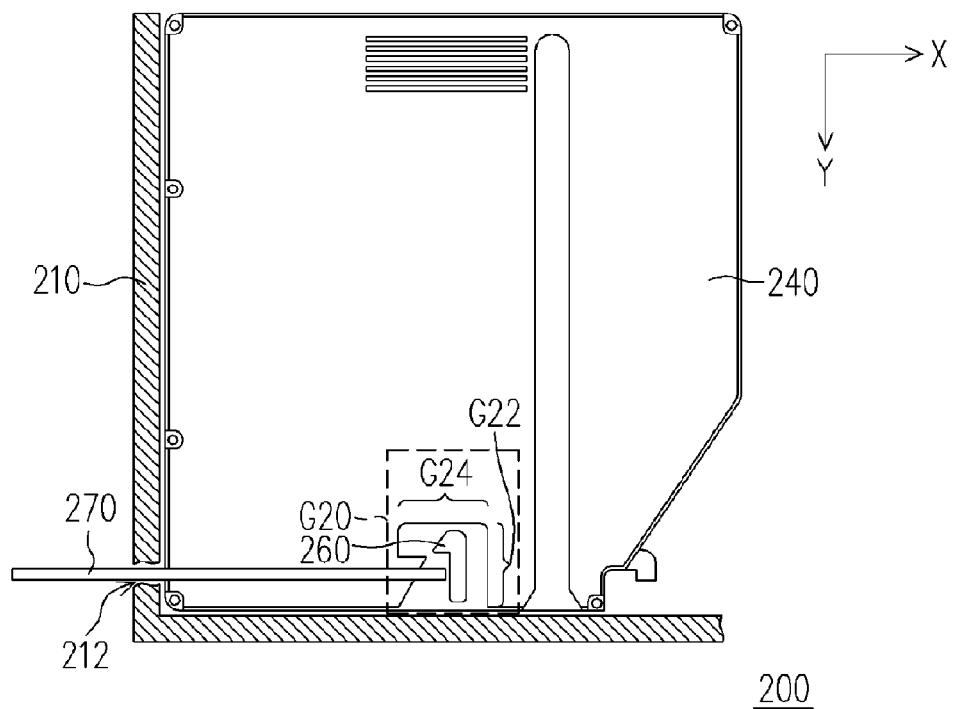

FIGS. 5A and 5B are partial cross-sectional views of an optical disc drive during a manual cassette ejection according to another embodiment of the present invention. As shown in FIGS. 5A and 5B, the optical disc drive 200 in the present invention differs from the optical disc drive 100 (as shown in FIG. 2A) of the previous embodiment in that the manual ejection element 170 is absent. Instead of a fixed manual ejection element, at rod element 270 not connected to the optical disc drive 200 can be used for manual ejection. In the following, only the difference between the two types of ejection designs is described while their similarity is not repeated. The housing 210 of the optical disc drive 200 has an ejection opening 212. The optical disc cassette 240 has an open fixing groove G20. When the optical disc cassette 240 is completely enclosed in the housing 210, the fixing element 260 of the optical disc drive 200 is lodged into the lodge groove portion G24 of the open fixing groove G20. The link between the lodge groove portion G24 and the sliding groove portion G22 is located on a side of the lodging groove portion G24 away from the housing 210; that is, on the right side in FIG. 5A.

To carry out a manual ejection, a user may insert a rod 270 through the ejection opening 212 of the housing 210 into the interior of the optical disc drive 200. Thereafter, the rod 270 pushes against the fixing element 260 for it to move toward the link between the lodging groove portion G24 and the sliding groove portion G22. Because the fixing element 260 in the Y-axis direction is no longer interfered by the open fixing groove G20, the optical disc cassette 240 can eject from the optical disc drive 200 through the force provided by the cassette ejector (not shown) in the Y-axis direction. To push the fixing element 260 forward smoothly using the rod 270, the ejection opening 212 is preferably disposed in a location corresponding to the fixing element 260. More definitely, the location of the ejection opening 212 is selected such that the rod 270 can automatically align with the fixing element 260 and push against the fixing element 260 when the user inserts the rod 270 through the ejection opening 212 into the optical disc drive 200.

Figure 6:
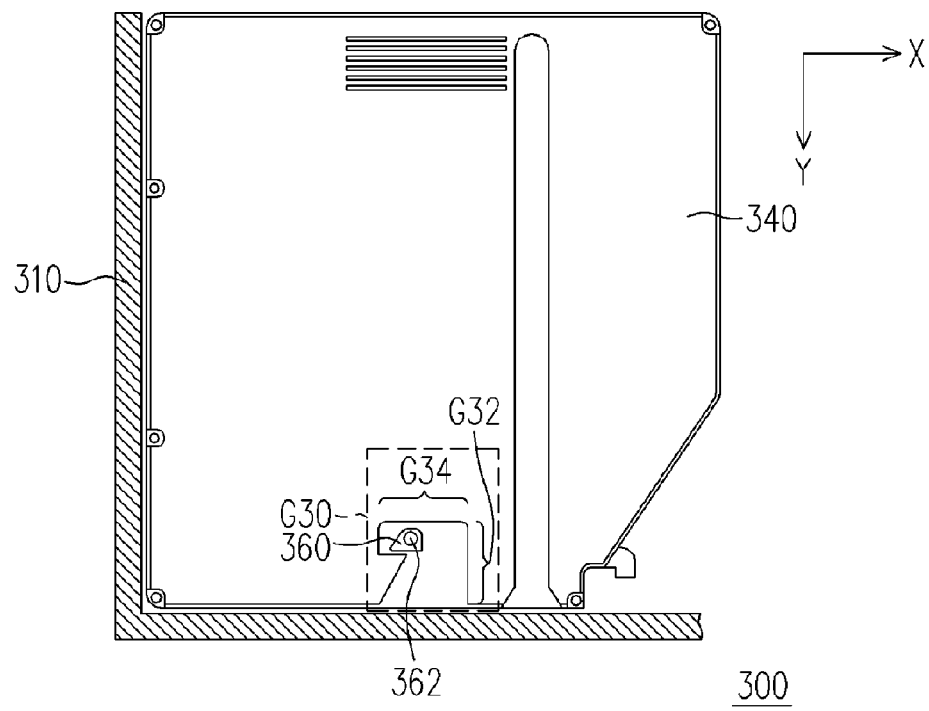
FIG. 6 is a partial cross-sectional view of an optical disc drive according to yet another embodiment of the present invention.
Figure 7:
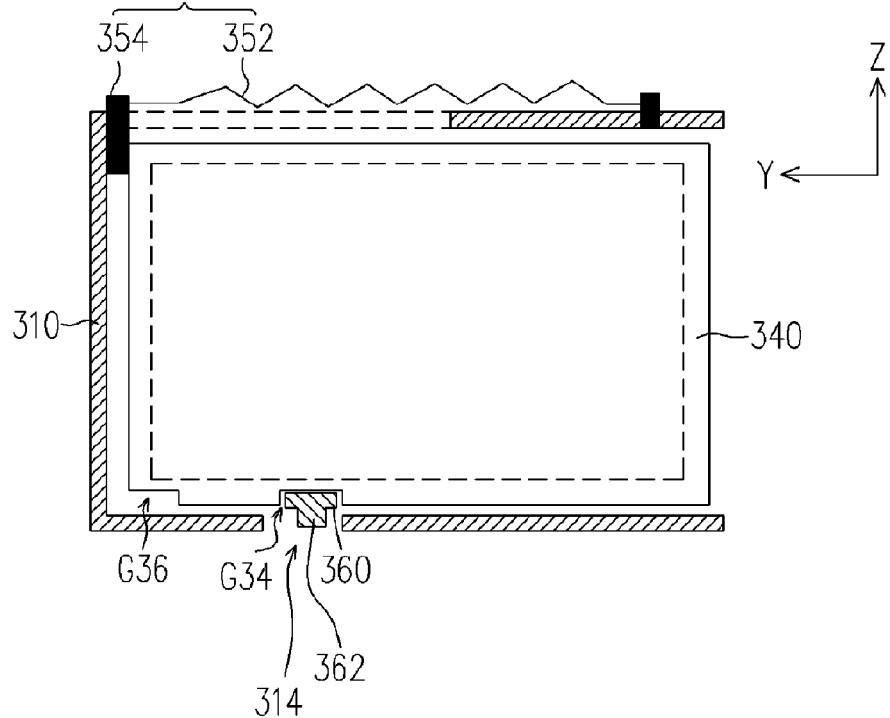
FIG. 7 is a cross-sectional view of the optical disc drive in FIG. 6 in a direction perpendicular to the X-axis.

FIG. 6 is a partial cross-sectional view of an optical disc drive according to yet another embodiment of the present invention. FIG. 7 is a cross-sectional view of the optical disc drive in FIG. 6 in a direction perpendicular to the X-axis. As shown in FIGS. 6 and 7, the optical disc drive 300 of the present invention differs from the previous embodiments in that the fixing element 360 has a protruding portion 362. The housing 310 of the optical disc drive 300 has an ejection opening 314 in the location where the fixing element 360 is disposed. The protruding portion 362 protrudes in the ejection opening 314 and is exposed outside the optical disc drive 300. Furthermore, the protruding portion 362 is suitable for moving inside the ejection opening 314. Therefore, when ejecting the discs manually, the user may directly push the protruding portion 362 of the fixing element 360 inside the ejection opening 314 to release the lodging relation between the fixing element 360 and the open fixing groove G30. Henceforth, the optical disc cassette 340 will be ejected from the interior of the optical disc drive 300 by the cassette ejector 350.

In addition, the manual ejection method of the present invention is mainly applied to an optical disc drive capable of holding a plurality of optical disc. The main spirit of this method is to manually release the lodging relation between the fixing element and the optical disc cassette inside the optical disc drive so that the cassette ejector can eject the cassette from the housing. In the manual cassette ejection method, the manual release of the lodging relation between the fixing element and the optical disc cassette includes pushing or pulling the fixing element. More definitely, the method utilizes a string connected to the fixing element to pull the fixing element or inserting a rod through an ejection opening on the housing to push the fixing element. Alternatively, a protruding portion of the fixing element exposed in an ejection opening on the housing can be pushed. Obviously, the method for manually releasing the lodging relation between the fixing element and the optical disc cassette is not limited to the aforementioned types.

In summary, the optical disc drive of the present invention has an ejection opening set up on the housing. When the design is combined with a manual ejection element such as a piece of string or a simple rod or a fixing element that can be pushed or pulled by hand, the lodging relation between the fixing element and the optical disc cassette can be changed manually. Hence, the cassette ejector can eject the optical disc cassette from the optical disc drive. In other words, even if the power supply to the optical disc drive is suddenly off or the driving signal for ejecting the cassette is in error, a manual ejection method can still be used to eject the optical disc cassette from the housing. Thus, the optical disc drive is more convenient for users.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive, comprising:
a first housing;
a disc exchanger, disposed inside the first housing, adapted within an operating range;
a data processing module disposed within the operating range inside the first housing;
an optical disc cassette, disposed in the operating range within the first housing for holding a plurality of optical discs, wherein the optical disc cassette has an open fixing groove;
a cassette ejector disposed on the first housing;
a fixing element set up on the first housing as a movable component suitable for lodging into the open fixing groove;
a manual ejection element connected to the fixing element and a portion thereof located on the first housing, wherein the manual ejection element is suitable for changing the relative position between the fixing element and the open fixing groove and suitable for ejecting the optical disc cassette from the first housing through the cassette ejector;
and a pulling element connected to a portion of the manual ejection element located on the first housing;
wherein the first housing has an ejection opening and the pulling element passes through the ejection opening to connect with the manual ejection element, and the pulling element has a dimension greater than the ejection opening.

2. The optical disc drive of claim 1, wherein the manual ejection element comprises a piece of string or a rod.

3. The optical disc drive of claim 1, wherein the first housing has an inlay groove that encloses the ejection opening and the pulling element is suitable for lodging on the inlay groove.

4. The optical disc drive of claim 1, wherein the optical disc cassette is injected into the first housing along a first direction and the fixing element moves along a second direction which is perpendicular to the first direction.

5. The optical disc drive of claim 1, wherein the open fixing groove comprises a sliding groove portion and a lodging groove portion, the sliding groove portion connected with the lodging groove portion and the fixing element is suitable for sliding into the sliding groove portion and lodging into the lodging groove portion.

6. The optical disc drive of claim 5, wherein the extension direction of the sliding groove portion forms an angle smaller than 90° with the extension direction of the lodging groove portion.

7. The optical disc drive of claim 5, wherein the optical disc drive is injected into the first housing along a first direction and the lodging groove portion extends in a direction perpendicular to the first direction.

8. The optical disc drive of claim 1, wherein the optical disc cassette comprises:
a second housing having an inner wall, an opening and multiple sets of guiding tracks, wherein the sets of guiding tracks are disposed on the inner wall and the guiding tracks extend towards the opening; and
a plurality of optical disc carriers disposed inside the second housing and each optical disc carrier suitable for moving along one set of guiding tracks.

9. The optical disc drive of claim 1, wherein the data processing module comprises an optical disc reading module or an optical disc reading/writing module.

10. An optical disc drive suitable for manual cassette ejection, the optical disc drive comprising:
a first housing having an ejection opening;
a disc exchanger disposed inside the first housing and adapted within an operating range;
a data processing module disposed within the operating range inside the first housing;

an optical disc cassette disposed within the operating range inside the first housing for holding a plurality of optical discs, wherein the optical disc cassette has an open fixing groove;

a cassette ejector disposed on the first housing; and a fixing element disposed on the first housing as a movable component suitable for lodging on the open fixing groove, wherein the relative position between the fixing element and the open fixing groove can be manually changed for ejecting the optical cassette disc from the first housing through the cassette ejector;

wherein the open fixing groove comprises a sliding groove portion and a lodging groove portion, the sliding groove portion connected with the lodging groove portion and the fixing element is suitable for sliding into the sliding groove portion and lodging into the lodging groove portion.

11. The optical disc drive of claim 10, wherein the optical disc cassette is injected into the first housing along a first direction and the fixing element moves along a second direction perpendicular to the first direction.

12. The optical disc drive of claim 10, wherein the extension direction of the sliding groove potion form an angle smaller than 90° with the extension direction of the lodging groove portion.

13. The optical disc drive of claim 10, wherein the optical disc cassette is injected into the first housing along a first direction and the lodging groove portion extends in a direction perpendicular to the first direction.

14. The optical disc drive of claim 10, wherein manual ejection is achieved by passing a rod trough the ejection opening to change the relative position between the fixing element and the open fixing groove.

15. The optical disc drive of claim 10, wherein the fixing element has a protruding portion that protrudes in the ejection opening and is exposed outside the optical disc drive, and the protruding portion is suitable for moving in the ejection opening.

16. The optical disc drive of claim 10, wherein the optical disc cassette comprises:

a second housing having an inner wall, an opening and multiple sets of guiding tracks, wherein the sets of guiding tracks are disposed on the inner wall and the guiding tacks extend towards the opening; and a plurality of optical disc carriers disposed inside the second housing and each optical disc carrier suitable for moving along one set of guiding tracks.

17. The optical disc drive of claim 10, wherein the data processing module comprises an optical disc reading module or an optical disc reading/writing module.

18. A manual cassette ejection method suitable for an optical disc drive, wherein the optical disc drive comprises a housing, an optical disc cassette, a cassette ejector and a fixing element, the optical disc cassette disposed inside housing for holding a plurality of optical discs, the cassette ejector suitable for ejecting the optical disc cassette from the housing, the fixing element disposed on the housing as a movable component suitable for lodging the optical disc cassette on the housing, the manual cassette ejection method comprising:

manually releasing the lodging relation between the fixing element and the optical disc cassette so that the cassette ejector can eject the optical disc cassette from the housing;

wherein the manual release of the lodging relation between the fixing element and the optical disc cassette comprises pulling the fixing element through a string connected to the fixing element.

19. The manual cassette ejection method of claim 18, wherein the manual release of the lodging relation between the fixing element and the optical disc cassette comprises pushing the fixing element through a rod passing through an ejection opening on the housing.

20. The manual cassette ejection method of claim 18, wherein the manual release of the lodging relation between the fixing element and the optical disc cassette comprises moving a protruding portion of the fixing element that protrudes in an ejection opening in the housing.

* * * * *